US006470677B2

(12) United States Patent

Bailey

(10) Patent No.: US 6,470,677 B2
(45) Date of Patent: Oct. 29, 2002

(54) FREE PISTON ENGINE SYSTEM WITH DIRECT DRIVE HYDRAULIC OUTPUT

(75) Inventor: Brett M. Bailey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/739,494

(22) Filed: Dec. 18, 2000

(65) Prior Publication Data

US 2002/0073703 A1 Jun. 20, 2002

(51) Int. Cl.[7] .......................... F16D 31/02; F04B 17/05
(52) U.S. Cl. .......................... 60/418; 60/484; 417/364
(58) Field of Search .......................... 60/484, 414, 417, 60/418; 180/367, 242; 417/364

(56) References Cited

U.S. PATENT DOCUMENTS

| | | | | |
|---|---|---|---|---|
| 3,509,721 A | * 5/1970 | Crawford | | 60/419 |
| 5,327,857 A | 7/1994 | Howell | | |
| 5,473,893 A | * 12/1995 | Achten et al. | | 60/413 |
| 5,878,649 A | 3/1999 | Raab | | |

FOREIGN PATENT DOCUMENTS

| | | |
|---|---|---|
| DE | 197 45 810 | 10/1997 |
| FR | 2 588 917 | 10/1985 |
| WO | WO 97/35104 | 3/1997 |

* cited by examiner

*Primary Examiner*—F. Daniel Lopez
*Assistant Examiner*—Michael Leslie
(74) *Attorney, Agent, or Firm*—Taylor & Aust, P.C.

(57) ABSTRACT

A free piston engine system, particularly suitable for use in a motorized vehicle, is provided with at least one hydraulic pump, each pump having a first fluid port and a second fluid port. A free piston internal combustion engine includes a combustion cylinder and a hydraulic cylinder. A low pressure accumulator is fluidly coupled with the hydraulic cylinder. A first control valve interconnects the low pressure accumulator with the hydraulic cylinder. At least one high pressure accumulator is fluidly coupled with the hydraulic cylinder. At least one second control valve is provided, with each second control valve interconnecting a respective high pressure accumulator with the hydraulic cylinder. A third control valve interconnects the hydraulic cylinder with the first fluid port of each pump. A fourth control valve interconnects the hydraulic cylinder with the second fluid port of each pump. A first working pressure accumulator is coupled between each pump and the third control valve or fourth control valve.

16 Claims, 2 Drawing Sheets

FREE PISTON ENGINE SYSTEM WITH DIRECT DRIVE HYDRAULIC OUTPUT

TECHNICAL FIELD

The present invention relates to free piston internal combustion engines, and, more particularly, to a free piston internal combustion engine having a hydraulic output and one or more accumulators.

BACKGROUND ART

Internal combustion engines typically include a plurality of pistons which are disposed within a plurality of corresponding combustion cylinders. Each of the pistons is pivotally connected to one end of a piston rod, which in turn is pivotally connected at the other end thereof with a common crank shaft. The relative axial displacement of each piston between a top dead center (TDC) position and a bottom dead center (BDC) position is determined by the angular orientation of the crank arm on the crankshaft with which each piston is connected.

A free piston internal combustion engine (FPE) likewise includes a plurality of pistons which are reciprocally disposed in a plurality of corresponding combustion cylinders. However, the pistons are not interconnected with each other through the use of a common crankshaft. Rather, each piston is typically rigidly connected with a plunger rod which is used to provide some type of work output. In a free piston engine with a hydraulic output, the plunger is used to pump hydraulic fluid which can be used for a particular application. Typically, the housing which defines a combustion cylinder also defines a hydraulic cylinder in which the plunger is disposed. The combustion cylinder has the largest diameter; and the hydraulic cylinder has the smaller diameter. The high pressure hydraulic accumulator which is fluidly connected with the hydraulic cylinder is pressurized through the reciprocating movement of the plunger during operation of the free piston engine. An additional hydraulic accumulator is selectively interconnected with the area in the hydraulic cylinder to exert a relatively high axial pressure against the compression head and thereby move the piston head toward the TDC position.

A free piston engine as described above is typically coupled with a hydraulic transformer which typically converts a high flow rate, low pressure hydraulic fluid to a low flow rate, high pressure hydraulic output, or vice versa. The hydraulic output from the hydraulic transformer is utilized to drive one or more components such as a pump within a work unit, such as a vehicle. An example of a hydraulic transformer as described above is disclosed in U.S. Pat. No. 5,878,649, (Raab), which is assigned to the assignee of the present invention.

A problem with utilizing an intermediary hydraulic pressure transformer as described above is that they inherently absorb some of the energy from the system and thereby render the system less efficient. Other methods of converting the hydraulic output power from the free piston engine to a rotating mechanical output power are also known and utilized. However, each of these intermediary power conversion techniques absorb energy from the system and render the system less efficient.

The present invention is directed to overcoming one or more of the problems as set forth above.

DISCLOSURE OF THE INVENTION

In one aspect of the invention, a free piston engine system is provided with at least one hydraulic pump, each pump having a first fluid port and a second fluid port. A free piston internal combustion engine includes a combustion cylinder, a hydraulic cylinder, a piston reciprocally disposed within the combustion cylinder, and a plunger attached to the piston and disposed within the hydraulic cylinder. A low pressure accumulator is fluidly coupled with the hydraulic cylinder. A first control valve interconnects the low pressure accumulator with the hydraulic cylinder. At least one high pressure accumulator is fluidly coupled with the hydraulic cylinder. At least one second control valve is provided, with each second control valve interconnecting a respective high pressure accumulator with the hydraulic cylinder. A third control valve interconnects the hydraulic cylinder with the first fluid port of each pump. A fourth control valve interconnects the hydraulic cylinder with the second fluid port of each pump. A first working pressure accumulator is coupled between each pump and the third control valve or fourth control valve.

In another aspect of the invention, a method of operating a free piston engine system is provided with the steps of: providing at least one hydraulic pump, each pump having a first fluid port and a second fluid port; providing a free piston internal combustion engine including a combustion cylinder, a hydraulic cylinder, a piston reciprocally disposed within the combustion cylinder, and a plunger attached to the piston and disposed within the hydraulic cylinder; fluidly coupling a first control valve between a low pressure accumulator and the hydraulic cylinder; fluidly coupling a second control valve between a high pressure accumulator and the hydraulic cylinder; fluidly coupling a third control valve between the hydraulic cylinder and the first fluid port of each pump; fluidly coupling a fourth control valve between the hydraulic cylinder and the second fluid port of each pump; coupling a first working pressure accumulator between each pump and one of the third control valve and the fourth control valve; and selectively controlling the first control valve, the second control valve, the third control valve and the fourth control valve to drive at least one pump in a closed flow path.

BEST MODE FOR CARRYING OUT THE INVENTION

Figure 1:
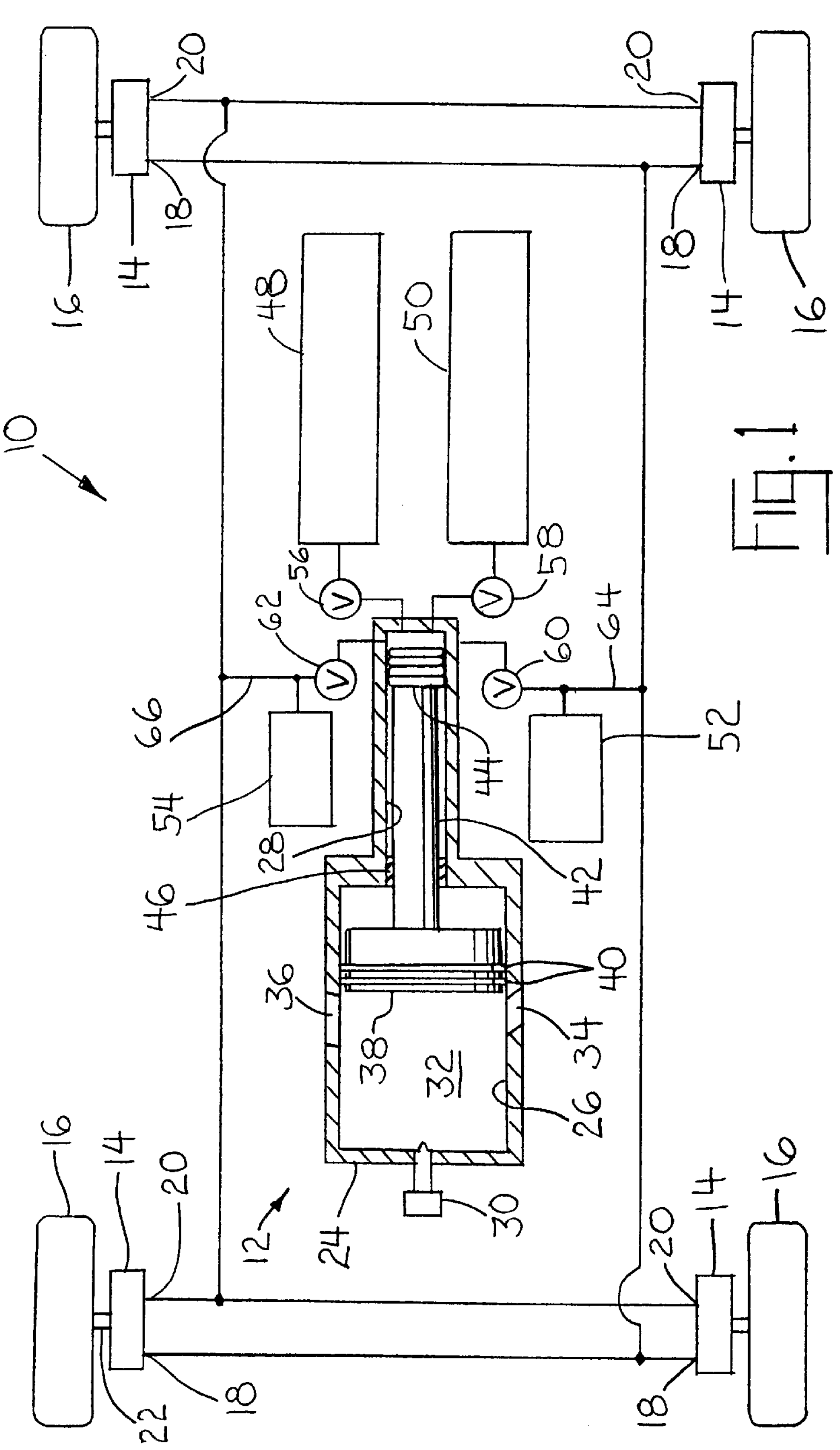
FIG. 1 is a schematic view of an embodiment of a free piston engine system of the present invention.

Referring now to the drawings, and more particularly to FIG. 1, there is shown an embodiment of a work unit in the form of a free piston engine system 10 of the present invention. In the embodiment shown, free piston engine system 10 is in the form of a vehicle including an FPE 12, a plurality of hydraulic pumps 14 and a plurality of wheels 16.

Each hydraulic pump 14 is a fixed geometry pump which is driven by hydraulic fluid provided by FPE 12. Each pump 14 includes a first fluid port 18, a second fluid port 20 and a rotatable output shaft 22. First fluid port 18 and second fluid port 20 may each act as an inlet or an outlet to rotatably drive output shaft 22 in a desired direction. It will be appreciated that while first fluid port 18 or second fluid port 20 acts as an inlet, the other of first fluid port 18 or second fluid port 20 acts as an outlet. Output shaft 22 is coupled with a corresponding wheel 16 for rotatably driving the corresponding wheel 16. Each pump 14 therefore acts as a drive motor for driving or a brake for braking the corresponding wheel 16.

FPE 12 includes a housing 24 defining a combustion cylinder 26 and a single respective hydraulic cylinder 28. A fuel injector 30 injects fuel, such as diesel fuel, into chamber 32 within combustion cylinder 26. Housing 24 also defines an intake port 34 and an exhaust port 36 which are disposed in communication with chamber 32.

FPE 12 also includes a piston 38 which is reciprocally disposed within combustion cylinder 26. Piston 38 is movable between a bottom dead center position (as shown) and a top dead center position (adjacent fuel injector 30) during operation. Piston 38 may include one or more rings 40 which inhibit blow-by of combustion products past piston 38.

A plunger 42 is coupled with piston 38 and reciprocally disposed within hydraulic cylinder 28. Plunger 42 includes a single plunger head 44 which slides adjacent the inside diameter of hydraulic cylinder 28. A bearing 46 carried by housing 24 assists in guiding plunger 42 within hydraulic cylinder 28.

According to an aspect of the present invention, a plurality of fluid reservoirs and controllable valves are fluidly coupled between hydraulic cylinder 28 and pumps 14. More particularly, a low pressure accumulator 48, a high pressure accumulator 50, a first working pressure accumulator 52 and a second working pressure accumulator 54 are each fluidly coupled with hydraulic cylinder 28. A first control valve 56 fluidly interconnects low pressure accumulator 48 with hydraulic cylinder 28; a second control valve 58 fluidly interconnects high pressure accumulator 50 with hydraulic cylinder 28; a third control valve 60 fluidly interconnects first working pressure accumulator 52 with hydraulic cylinder 28; and a fourth control valve 62 fluidly interconnects second working pressure accumulator 54 with hydraulic cylinder 28. In the embodiment shown, first control valve 56 is in the form of a controllable, high speed electro-hydraulic poppet valve; second control valve 58 is in the form of a controllable, high speed electro-hydraulic poppet valve; third control valve 60 is in the form of a controllable, high speed electro-hydraulic spool valve and fourth control valve 62 is in the form of a controllable, high speed electro-hydraulic spool valve.

First control valve 56 and second control valve 58 are each configured to open and close at a selected pressure. More particularly, first control valve 56 is configured to open when the pressure within hydraulic cylinder 28 falls below a predetermined level (as when plunger 42 is moving toward a top dead center position); and second control valve 58 is configured to open when a pressure within hydraulic cylinder 28 rises above a predetermined level (as when plunger 42 moves toward a bottom dead center position during a compression stroke). First control valve 56 and second control valve 58 may also be selectively opened and closed regardless of the pressure using a controller (not shown).

Figure 2:
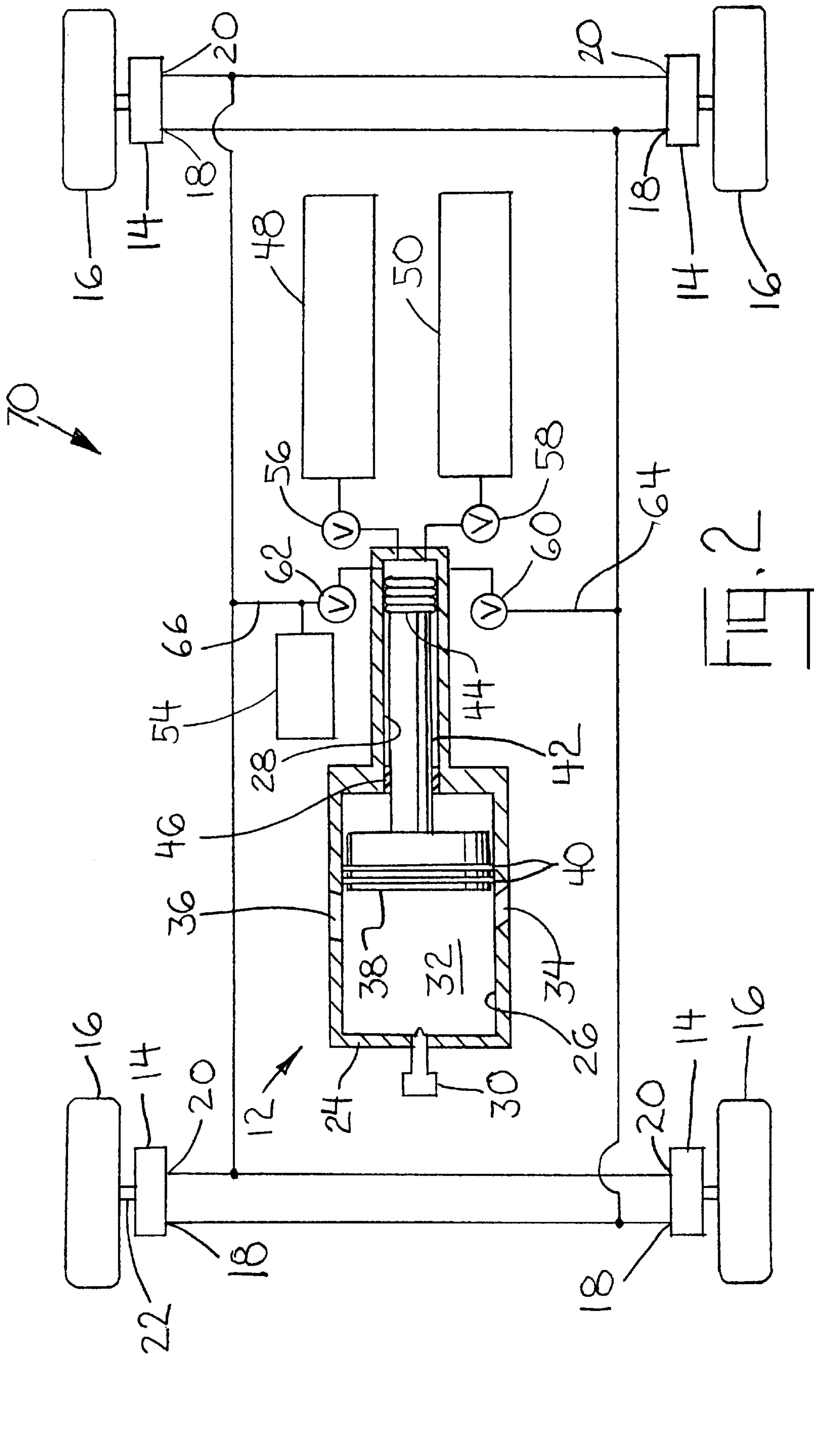
FIG. 2 is a schematic view of another embodiment of a free piston engine system of the present invention.

FIG. 2 illustrates another embodiment of a work unit/free piston engine system 70 of the present invention. Free piston engine system 70 includes most of the system components within free piston engine system 10 shown in FIG. 1. However, free piston engine system 70 shown in FIG. 2 lacks working pressure accumulator 52. Third control valve 60 is actuated such that pressurized hydraulic fluid is directly supplied to each pump 14 during operation. Pressurized hydraulic fluid is transported through fluid line 64 for driving wheels 16 in a forward direction. Thus, pressurized fluid normally flows through fluid line 64 during a compression stroke of piston 38 and plunger 42. Working pressure accumulator 54 is still provided to act as a gas spring for the hydraulic fluid which returns from pumps 14 via return line 66. Valves 56, 58, 60 and 62 may be controllably actuated using any of a number of different control schemes.

Industrial Applicability

During operation, fuel, such as diesel fuel, is injected into chamber 32 within combustion cylinder 26. High pressure accumulator 50 is preliminarily charged using known methods, such as a pump (not shown), etc. Second control valve 58 is opened to cause a pulse of high pressure fluid to flow from high pressure accumulator 50 into hydraulic cylinder 28.

The high pressure hydraulic fluid exerts an axial force against head 44, which in turn moves piston 38 toward a top dead center position. Piston 38 closes intake port 34 and exhaust port 36 as it moves toward the top dead center position, and combusts the fuel within chamber 32 at or near the top dead center position during a compression stroke. As plunger 42 moves toward the top dead center position, first control valve 56 opens and second control valve 58 closes as a result of the decreasing pressure within hydraulic cylinder 28. The energy caused by the combustion within chamber 32 causes piston 38 and plunger 42 to move toward a bottom dead center position. The increasing pressure within hydraulic cylinder 28 causes first control valve 56 to close and second control valve 58 to open. The high pressure fluid within hydraulic cylinder 28 is pumped into high pressure accumulator 50, thereby charging high pressure accumulator 50. The pressure within high pressure accumulator 50 may be sensed, and FPE 12 is continually operated in a pulsed manner until the pressure therein is at a predetermined level.

To rotatably drive wheels 16, third control valve 60 and fourth control valve 62 are selectively actuated to provide hydraulic fluid flow through each pump 14 in a closed flow path. Each first fluid port 18 is coupled in parallel with third control valve 60; and each second fluid port 20 is fluidly coupled in parallel with fourth control valve 62. Assuming that each first fluid port 18 acts as an inlet port and each second fluid port 20 acts as an outlet port, third control valve 60 provides high pressure hydraulic fluid via fluid line 64 to each first fluid port 18 and fourth control valve 62 receives hydraulic fluid from each second fluid port 20 via a return fluid line 66.

First working pressure accumulator 52 acts as a storage accumulator for providing high pressure fluid to each first fluid port 18. To pressurize first working pressure accumulator 52, first control valve 56 and fourth control valve 62 are closed while second control valve 58 and third control valve 60 are opened. It will be noted that the physical size of high pressure accumulator 50 is larger than the size of first working pressure accumulator 52 to allow first working pressure accumulator 52 to be charged with high pressure fluid.

High pressure fluid concurrently flows in a parallel manner via high pressure fluid line 64 to each first fluid port 18. First working pressure accumulator 52 therefore acts as a gas spring absorbing some of the pressure fluctuations within high pressure fluid line 64 and providing a more even pressure within high pressure fluid line 64. The high pressure fluid rotatably drives each pump 14 and is returned to fourth control valve 62 via return fluid line 66. Second working pressure accumulator 54 again acts as a gas spring to alleviate pressure fluctuations within return fluid line 66. First control valve 56 and fourth control valve 62 may be opened while second control valve 58 and third control valve 60 are closed so that the fluid within return fluid line 66 may be used to recharge low pressure accumulator 48.

The sequencing and timing of selectively actuating first control valve 56, second control valve 58, third control valve 60 and fourth control valve 62 may be effected utilizing pressure sensors associated with high pressure fluid line 64, return fluid line 66, low pressure accumulator 48 and high pressure accumulator 50.

To reverse the rotational direction of each output shaft 22, each second fluid port 20 acts as an inlet and each first fluid port 18 acts as an outlet for each pump 14. Fluid line 66 thus becomes a high pressure line and fluid line 64 becomes a return line. The method of operation is otherwise substantially the same as described above, and thus will not be described in further detail.

To effect freewheeling of each output shaft 22, third control valve 60 and fourth control valve 62 may be concurrently opened. This essentially equalizes the pressure between fluid line 64 and fluid line 66 and thereby does not result in a driving force being applied to each pump 14.

The free piston engine system of the present invention directly couples the plurality of hydraulic pumps in the vehicle with the accumulators associated with the free piston engine. Accordingly, an intermediary power conversion device is eliminated, and the overall efficiency of the system is improved. The fluid flow between the hydraulic cylinder in the free piston engine and the plurality of the hydraulic pumps may be carried out in a closed flow path, thereby further conserving energy within the system. The control valves which are associated with each respected accumulator may be controllably actuated to pressurize the system and effect flow in the closed flow path.

In the method of operation described above, free piston engine system 10 of the present invention is controlled in a particular manner as described above. However, it is also to be appreciated that free piston engine system 10 and/or free piston engine system 70 may be controllably actuated using valves 56, 58, 60 and 62 to provide different fluid flows under different pressures, depending upon the particular application. For example, if a fast acceleration is desirable, valves 56, 58 and 60 may each be opened while valve 62 is closed in order to provide maximum fluid flow to pumps 14 driving wheels 16. Alternatively, it is possible to open valves 58 and 60 while maintaining valves 56 and 62 in a closed state. Other control schemes are of course possible, and within the scope of this invention.

Other aspects, objects and advantages of this invention can be obtained from a study of the drawings, the disclosure and the appended claims.

What is claimed is:

1. A free piston engine system, comprising:

at least one hydraulic pump, each said pump having a first fluid port and a second fluid port;

a free piston internal combustion engine including a combustion cylinder having a single respective hydraulic cylinder associated therewith, a piston reciprocally disposed within said combustion cylinder, and a single plunger attached to said piston, said plunger being disposed within said hydraulic cylinder;

a low pressure accumulator fluidly coupled with said hydraulic cylinder;

a first control valve interconnecting said low pressure accumulator with said hydraulic cylinder;

at least one high pressure accumulator fluidly coupled with said hydraulic cylinder;

at least one second control valve, each said second control valve interconnecting a respective said high pressure accumulator with said hydraulic cylinder;

a third control valve interconnecting said hydraulic cylinder with said first fluid port of each said pump;

a fourth control valve interconnecting said hydraulic cylinder with said second fluid port of each said pump; and a first working pressure accumulator coupled between each said pump and one of said third control valve and said fourth control valve.

2. The free piston engine system of claim 1, said first control valve being a controllable electro-hydraulic poppet valve.

3. The free piston engine system of claim 1, said at least one high pressure accumulator being one high pressure accumulator, and said at least one second control valve being a single second control valve.

4. The free piston engine system of claim 1, said at least one hydraulic pump being four hydraulic pumps.

5. The free piston engine system of claim 1, each said hydraulic pump being a fixed geometry hydraulic pump.

6. The free piston engine system of claim 1, said free piston engine system being a vehicle with a plurality of wheels, each said hydraulic pump being a drive motor for a corresponding said wheel.

7. A free piston engine system, comprising:

at least one hydraulic pump, each said pump having a first fluid port and a second fluid port;

a free piston internal combustion engine including a combustion cylinder, a hydraulic cylinder, a piston reciprocally disposed within said combustion cylinder, and a plunger attached to said piston and disposed within said hydraulic cylinder;

a low pressure accumulator fluidly coupled with said hydraulic cylinder;

a first control valve interconnecting said low pressure accumulator with said hydraulic cylinder;

at least one high pressure accumulator fluidly coupled with said hydraulic cylinder;

at least one second control valve, each said second control valve interconnecting a respective said high pressure accumulator with said hydraulic cylinder, each said second control valve being a controllable electro-hydraulic poppet valve;

a third control valve interconnecting said hydraulic cylinder with said first fluid port of each said pump;

a fourth control valve interconnecting said hydraulic cylinder with said second fluid port of each said pump; and a first working pressure accumulator coupled between each said pump and one of said third control valve and said fourth control valve.

8. A free piston engine system, comprising:

at least one hydraulic pump, each said pump having a first fluid port and a second fluid port;

a free piston internal combustion engine including a combustion cylinder, a hydraulic cylinder, a piston reciprocally disposed within said combustion cylinder, and a plunger attached to said piston and disposed within said hydraulic cylinder;

a low pressure accumulator fluidly coupled with said hydraulic cylinder;

a first control valve interconnecting said low pressure accumulator with said hydraulic cylinder;

at least one high pressure accumulator fluidly coupled with said hydraulic cylinder;

at least one second control valve, each said second control valve interconnecting a respective said high pressure accumulator with said hydraulic cylinder;

a third control valve interconnecting said hydraulic cylinder with said first fluid port of each said pump;

a fourth control valve interconnecting said hydraulic cylinder with said second fluid port of each said pump, at least one of said third control valve and said fourth control valve being an electro-hydraulic spool valve; and a first working pressure accumulator coupled between each said pump and one of said third control valve and said fourth control valve.

9. The free piston engine system of claim 8, said fourth control valve being an electro-hydraulic spool valve.

10. A free piston engine system, comprising:

at least one hydraulic pump, each said pump having a first fluid port and a second fluid port;

a free piston internal combustion engine including a combustion cylinder, a hydraulic cylinder, a piston reciprocally disposed within said combustion cylinder, and a plunger attached to said piston and disposed within said hydraulic cylinder;

a low pressure accumulator fluidly coupled with said hydraulic cylinder;

a first control valve interconnecting said low pressure accumulator with said hydraulic cylinder;

at least one high pressure accumulator fluidly coupled with said hydraulic cylinder;

at least one second control valve, each said second control valve interconnecting a respective said high pressure accumulator with said hydraulic cylinder;

a third control valve interconnecting said hydraulic cylinder with said first fluid port of each said pump;

a fourth control valve interconnecting said hydraulic cylinder with said second fluid port of each said pump;

a first working pressure accumulator coupled between each said pump and one of said third control valve and said fourth control valve; and a second working pressure accumulator coupled between each said pump and an other of said third control valve and said fourth control valve.

11. The free piston engine system of claim 10, said first working pressure accumulator coupled between each said pump and said third control valve, and said second working pressure accumulator coupled between each said pump and said fourth control valve.

12. A work unit, comprising:

at least one hydraulic pump, each said pump having a first fluid port and a second fluid port;

a high pressure hydraulic source including a single hydraulic chamber associated therewith;

a low pressure accumulator fluidly coupled with said single hydraulic chamber;

a first control valve interconnecting said low pressure accumulator with said single hydraulic chamber;

at least one high pressure accumulator fluidly coupled with said single hydraulic chamber;

at least one second control valve, each said second control valve interconnecting a respective said high pressure accumulator with said single hydraulic chamber;

a third control valve interconnecting said single hydraulic chamber with said first fluid port of each said pump;

a fourth control valve interconnecting said single hydraulic chamber with said second fluid port of each said pump; and a first working pressure accumulator coupled between each said pump and one of said third control valve and said fourth control valve.

13. The work unit of claim 12, said high pressure hydraulic source being a free piston internal combustion engine including a combustion cylinder, a hydraulic cylinder, a piston reciprocally disposed within said combustion cylinder, and a plunger attached to said piston and disposed within said hydraulic cylinder, said hydraulic cylinder being said single hydraulic chamber.

14. A method of operating a free piston engine system, comprising the steps of:

providing at least one hydraulic pump, each said pump having a first fluid port and a second fluid port;

providing a free piston internal combustion engine including a combustion cylinder, a hydraulic cylinder, a piston reciprocally disposed within said combustion cylinder, and a plunger attached to said piston and disposed within said hydraulic cylinder;

fluidly coupling a first control valve between a low pressure accumulator and said hydraulic cylinder;

fluidly coupling a second control valve between a high pressure accumulator and said hydraulic cylinder;

fluidly coupling a third control valve between said hydraulic cylinder and said first fluid port of each said pump;

fluidly coupling a fourth control valve between said hydraulic cylinder and said second fluid port of each said pump;

coupling a first working pressure accumulator between each said PUMP and one of said third control valve and said fourth control valve; and selectively controlling said first control valve, said second control valve, said third control valve and said fourth control valve to drive at least one said pump in a closed flow path.

15. The method of claim 14, wherein said selectively controlling step drives each said pump in said closed flow path.

16. The method of claim 14, including the step of fluidly coupling an additional second control valve between an additional high pressure accumulator and said hydraulic cylinder.

* * * * *